(12) United States Patent
Sannomiya et al.

(10) Patent No.: US 8,530,550 B2
(45) Date of Patent: Sep. 10, 2013

(54) CROSSLINKABLE RUBBER COMPOSITION

(75) Inventors: Akira Sannomiya, Minato-Ku (JP); Kenji Iida, Sodegaura (JP); Noriyuki Meguriya, Annaka (JP); Atsuhito Kashima, Annaka (JP)

(73) Assignees: Mitsui Chemicals, Inc., Tokyo (JP); Shin-Ets Chemical Co., Ltd., Tokyo (JP)

( * ) Notice: Subject to any disclaimer, the term of this patent is extended or adjusted under 35 U.S.C. 154(b) by 72 days.

(21) Appl. No.: 13/151,023

(22) Filed: Jun. 1, 2011

(65) Prior Publication Data

US 2011/0301278 A1    Dec. 8, 2011

(30) Foreign Application Priority Data

Jun. 2, 2010    (JP) ................. 2010-126799

(51) Int. Cl.
*C08L 47/00*    (2006.01)
*C08L 83/05*    (2006.01)

(52) U.S. Cl.
USPC ........... 524/101; 525/105; 524/506; 524/265; 524/236; 524/366

(58) Field of Classification Search
USPC .............. 524/506, 105, 101, 265, 236, 366; 525/105; 526/283
See application file for complete search history.

(56) References Cited

U.S. PATENT DOCUMENTS 7,208,548 B2    4/2007    Hakuta et al.

FOREIGN PATENT DOCUMENTS

| EP | 1 088 855 A1 | | 4/2001 |
|---|---|---|---|
| EP | 1 088 855 A1 | * | 4/2001 |
| EP | 1 293 534 A1 | | 3/2003 |
| EP | 1 293 534 A1 | * | 3/2003 |
| JP | 4-185687 A | | 7/1992 |
| JP | 2001-31802 A | | 2/2001 |
| JP | 2001-279027 A | | 10/2001 |
| JP | 2008-156574 A | | 7/2008 |

OTHER PUBLICATIONS

European Search Report issued Jul. 25, 2011, in European Patent Application No. 11168411.4.

* cited by examiner

Primary Examiner — Robert D. Harlan
(74) Attorney, Agent, or Firm — Birch, Stewart, Kolasch & Birch, LLP

(57) ABSTRACT

A crosslinkable rubber composition includes, as essential components:
(A) an ethylene-α-olefin-nonconjugated polyene random copolymer rubber in which the nonconjugated polyene has a terminal vinyl group-containing norbornene compound represented by the following general formula (1) or (II),

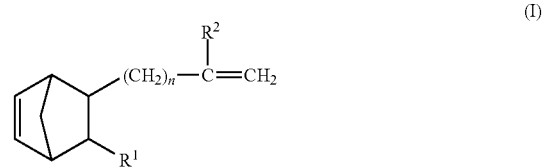

wherein n is an integer of 0 to 10, $R^1$ is H or an alkyl group, and $R^2$ is H or an alkyl group,

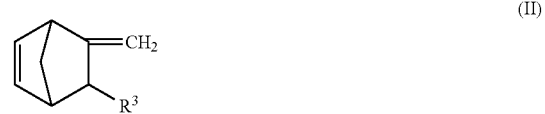

wherein $R^3$ is H or an alkyl group, and which has a viscosity of not less than 10 Pa·s and less than 1,000 Pa·s at 25° C. under a shear rate of 10 $s^{-1}$;
(B) an organopolysiloxane which has three repeating units of siloxane represented by the following formula and which has three Si-bonded hydrogen atoms per molecule,

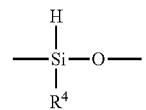

wherein $R^4$ is a monovalent hydrocarbon group;
(C) a reinforcing filler;
(D) a curing catalyst; and
(E) a curing reaction retarder.

18 Claims, No Drawings

CROSSLINKABLE RUBBER COMPOSITION

CROSS-REFERENCE TO RELATED APPLICATION

This non-provisional application claims priority under 35 U.S.C. §119(a) on Patent Application No. 2010-126799 filed in Japan on Jun. 2, 2010, the entire contents of which are hereby incorporated by reference.

TECHNICAL FIELD

The present invention relates to a crosslinkable rubber composition, more particularly to a material which is suitable for molding such as liquid injection molding, transfer molding and compression molding, due to its high crosslinking rate, excellent mold release properties, and long pot life after mixing, and which is suitable for thin film formation such as extrusion and calendaring, due to its being insusceptible to hindrance of cure in the air. The crosslinkable rubber composition is suitable for automotive use, for example, weather strip, various hoses such as radiator hose and brake hose, rubber vibration insulator such as engine mount, seals such as radiator seal and piston seal, cups such as cylinder cup, and various diaphragms, O-rings, etc. In addition, the crosslinkable rubber composition is suited to electrical insulation use such as wire joint, terminating parts, etc. The crosslinkable rubber composition is also suitable for OA equipment roller use such as electrically chargeable roller, transfer roller, developing roller and paper feeding roller, and for industrial roll use such as ironmaking roll, paper-making roll and printing wire roll. In addition, the crosslinkable rubber composition is suited to use as domestic rubber products such as rain apparel, rubber band, shoes and boots, rubber gloves, golf ball and diving gears. Further, the crosslinkable rubber composition is suitable for application to water barrier sheets in civil engineering, seals in fuel cells, etc.

BACKGROUND ART

Ethylene-α-olefin-nonconjugated polyene random copolymers such as EPDM, in general, are excellent in weatherability, heat resistance, and ozone resistance, and are widely used to make automotive industrial parts, industrial rubber products, electrical insulating material, civil engineering and construction material, rubberized fabric, etc.

Conventional ethylene-α-olefin-nonconjugated polyene random copolymer rubbers have the drawback of poorer compression set properties, as compared with silicone rubbers and the like. In order to solve the drawback, a method of adopting peroxide crosslinking in place of sulfur vulcanization is effective. This method, however, is disadvantageous in that in the case where hot air crosslinking by use of HAV (hot air vulcanization) or UHF (ultrahigh frequency electromagnetic waves) is performed, the rubber surface would not be crosslinked or be deteriorated, leading to extremely poor scratch resistance.

Meanwhile, JP-A 4-185687 (Patent Document 1) discloses a composition which contains a compound having at least one alkenyl group in the molecule thereof, a compound having at least two hydrosilyl groups in the molecule thereof, and a hydrosilylating catalyst. This composition, however, is insufficient in curability, and its compression set property is also unsatisfactory.

JP-A 2001-31802 (Patent Document 2) discloses a composition which contains an alkenyl group-containing compound having a specific structure, a compound having at least two hydrosilyl groups in the molecule thereof, and a hydrosilylating catalyst. However, the SiH compound used in Examples has a demerit in that the rubber compound after mixing has a very short pot life at room temperature, so that the workability (handleability) and shelf stability are poor. Therefore, the composition is unsuitable for ordinary rubber forming processes.

JP-A 2001-279027 (Patent Document 3) discloses an alkenyl group-containing compound having a specific structure and a cyclic polysiloxane having at least two SiH groups in one molecule thereof. However, the SiH compound used in Examples is only a polysiloxane having four SiH groups in one molecule thereof, and the composition is unsatisfactory in rubber properties.

JP-A 2008-156574 (Patent Document 4) discloses a method in which an alkenyl group-containing compound having a specific structure and a compound having two SiH groups and three SiH groups at terminal ends of the molecule thereof are used in combination. This material, however, is disadvantageous in that it is difficult to regulate the pot life at room temperature, the workability (handleability) and shelf stability are poor, and the material is unsuited to various forming or molding processes.

SUMMARY OF THE INVENTION

The present invention has been made in consideration of the above-mentioned circumstances. Accordingly, it is an object of the present invention to provide a crosslinkable rubber composition which has a long pot life, is excellent in workability (handleability) and shelf stability, has a good formability, and gives cured rubber products with excellent physical properties.

In order to attain the above object, the present inventors made intensive and extensive investigations. As a result of their investigations, they have found out that when an ethylene-α-olefin-nonconjugated polyene random copolymer rubber in which the nonconjugated polyene has at least one terminal vinyl group-containing norbornene compound represented by the general formula (I) or (II) is mixed with an organopolysiloxane having an SiH group in a side chain of the molecule thereof, there is obtained a rubber composition which is good in formability, has a long pot life, is excellent in workability (handleability) and shelf stability, and shows excellent rubber properties when cured. Based on the finding, they have completed the present invention.

Thus, according to the present invention, there is provided a crosslinkable rubber composition, including, as essential components:

[1] A crosslinkable rubber composition comprising as essential components:

(A) 100 parts by weight of an ethylene-α-olefin-nonconjugated polyene random copolymer rubber in which the nonconjugated polyene has at least one terminal vinyl group-containing norbornene compound represented by the following general formula (I) or (II),

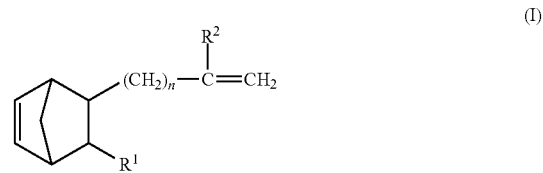

wherein n is an integer of 0 to 10, $R^1$ is hydrogen atom or an alkyl group of 1 to 10 carbon atoms, and $R^2$ is hydrogen atom or an alkyl group of 1 to 5 carbon atoms,

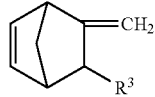
(II)

wherein $R^3$ is hydrogen atom or an alkyl group of 1 to 10 carbon atoms, and which has a viscosity of not less than 10 Pa·s and less than 1,000 Pa·s at 25° C. under a shear rate of 10 $s^{-1}$:

(B) 0.1 to 50 parts by weight of an organopolysiloxane which has three repeating units of siloxane represented by the following formula and which has three Si-bonded hydrogen atoms per molecule,

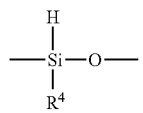

wherein $R^4$ is an unsubstituted or substituted monovalent hydrocarbon group of 1 to 20 carbon atoms;

(C) 0 to 100 parts by weight of a reinforcing filler;
(D) a catalytic amount of a curing catalyst; and
(E) 0.001 to 5 parts by weight of a curing reaction retarder.

[2] The crosslinkable rubber composition according to [1], wherein component (B) is an organopolysiloxane which has three Si-bonded hydrogen atoms per molecule in side chains of siloxane represented by the following formula:

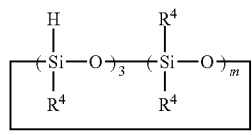

wherein $R^4$ is, identical or different, an unsubstituted or substituted monovalent hydrocarbon groups of 1 to 20 carbon atoms, and m is an integer of 1 to 20.

[3] The crosslinkable rubber composition according to [1] or [2], wherein the curing reaction retarder of component (E) is a compound which has an OH group and an alkynyl group in one molecule thereof.

In the crosslinkable rubber composition, preferably, the curing reaction retarder of component (E) is a compound having a OH group and an alkynyl group in one molecule thereof, which promises a longer pot life.

ADVANTAGEOUS EFFECTS OF THE INVENTION

The rubber composition according to the present invention has a long pot life and a good formability, and gives cured rubber products with excellent rubber properties.

DESCRIPTION OF THE EMBODIMENTS

Now, the present invention will be described in more detail below.

[Component (A)]

Component (A) contains a structural unit derived from ethylene, a structural unit derived from an α-olefin having 3 to 20 carbon atoms, and a structural unit derived from at least one nonconjugated polyene.

In this case, the first essential component [component (A)] of the rubber composition according to the present invention is an ethylene-α-olefin-nonconjugated polyene random copolymer rubber in which at least one norbornene compound represented by the following general formula (I) or (II) is contained as a building block:

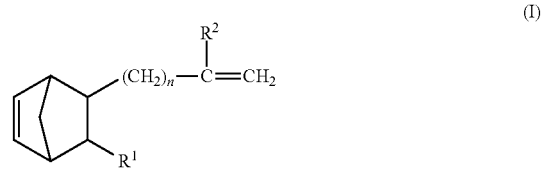
(I)

(where n is an integer of 0 to 10, $R^1$ is a hydrogen atom or an alkyl group having 1 to 10 carbon atoms, and $R^2$ is a hydrogen atom or an alkyl group having 1 to 5 carbon atoms),

(II)

(where $R^3$ is a hydrogen atom or an alkyl group having 1 to 10 carbon atoms).

In the above-mentioned ethylene-α-olefin-nonconjugated polyene copolymer, the structural unit derived from the α-olefin having 3 to 20 carbon atoms (hereafter referred also to simply as "α-olefin") imparts pliability (low crystallinity) to component (A).

The number of carbon atoms in the α-olefin is preferably in the range of 3 to 8, from the viewpoint of raw material cost, mechanical properties of the copolymer in the present invention, and rubber elasticity of formed products obtained from the composition containing the copolymer.

Examples of such an α-olefin include propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene, among which preferred are propylene, 1-butene, 1-hexene and 1-octene.

The α-olefins may be used either singly or in combination of two or more of them.

The proportion of the structural unit derived from the α-olefin based on the whole structural units of the copolymer in the present invention can be measured by known methods; for example, the proportion can be determined by measurement of $^1$H-NMR spectrum.

<Nonconjugated Polyene>

The structural unit derived from the nonconjugated polyene imparts crosslinking reactivity to the copolymer rubber (A).

The nonconjugated polyene is not particularly limited insofar as it has at least two double bonds (ordinarily, not more than four double bonds) and the double bonds are not conjugated. From the viewpoint of cost, however, the nonconjugated polyene is preferably a nonconjugated diene having 5 to 20 carbon atoms, more preferably a nonconjugated diene having 5 to 15 carbon atoms.

Examples of such a nonconjugated diene include cyclic nonconjugated dienes such as 5-ethylidene-2-norbornene (ENB), dicyclopendadiene, 5-vinyl-2-norbornene (VNB), norbornadiene and methyltetrahydroindene, and chain nonconjugated dienes such as 1,4-hexadiene and 7-methyl-1,6-octadiene.

Among these nonconjugated dienes, preferred for use are 5-ethylidene-2-norbornene (ENB), dicyclopentadiene and 5-vinyl-2-norbornene (VNB), of which particularly preferred is 5-ethylidene-2-norbornene (ENB).

The nonconjugated polyenes may be used either singly or in combination of two or more of them.

The proportion of the structural unit derived from the nonconjugated polyene based on the whole structural units of the copolymer in the present invention can be measured by known methods; for example, the proportion can be determined by measurement of $^1$H-NMR spectrum.

[Preparation Method for Component (A)]

The method for preparing component (A) is not particularly restricted; for example, component (A) can be obtained by subjecting ethylene, the α-olefin and the nonconjugated polyene to random copolymerization in the presence of a catalyst containing a vanadium catalyst and an organoaluminum catalyst as main ingredients. As for specific examples of the catalyst, examples of the vanadium catalyst include $VOCl_3$ and $VO(OC_2H_5)_3$, and examples of the organoaluminum catalyst include triethylaluminum and diethylaluminum ethoxide. In this case, the random copolymerization of ethylene, the α-olefin and the nonconjugated polyene is carried out at a polymerization temperature of 30 to 60° C., desirably 30 to 50° C., a polymerization pressure of 4 to 12 kgf/cm$^2$, particularly 5 to 8 kgf/cm$^2$, and a molar ratio of the nonconjugated polyene to ethylene (nonconjugated polyene/ethylene) in the range of 0.01 to 0.2. Incidentally, the copolymerization is preferably performed in a hydrocarbon medium.

Besides, as the nonconjugated polyene component put to copolymerization, such nonconjugated polyenes as mentioned below can be jointly used, in addition to the at least one norbornene compound represented by the above-mentioned general formula (I) or (II), within a range such as not to be detrimental to the purpose of the present invention.

Examples of the nonconjugated polyenes which can be jointly used here include 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, etc.; chain nonconjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, etc.; cyclic nonconjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, dicyclopentadiene, etc.; and trienes such as 2,3-diisopropylidene-5-norbornene, 2-ethylidene-3-isopropylidene-5-norbornene, 2-propenyl-2,2-norbornadiene, etc. Among these nonconjugated polyenes, preferred are 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, and 5-(7-octenyl)-2-norbornene.

Component (A) preferably contains (a) the ethylene unit and (b) the α-olefin unit in a molar ratio [(a)/(b)] in the range of 40/60 to 95/5, preferably 50/50 to 90/10, more preferably 55/45 to 85/15, and particularly preferably 60/40 to 80/20.

When the molar ratio is within the above-mentioned range, there can be obtained a rubber composition which can yield a formed product of crosslinked rubber being particularly excellent in thermal aging resistance, strength characteristics and rubber elasticity and being excellent in low-temperature resistance and processability.

As for the proportion of the nonconjugated polyene, the nonconjugated polyene is preferably blended in such a proportion that the content of the alkenyl group (terminal vinyl group) derived from the nonconjugated polyene in the ethylene-α-olefin-nonconjugated polyene random copolymer rubber upon copolymerization will be 0.0001 to 0.002 mol/g, particularly 0.0002 to 0.001 mol/g. If the alkenyl group (terminal vinyl group) content is too low, it may be impossible to obtain a crosslinked rubber product with sufficient rubber properties. On the other hand, if the alkenyl group (terminal vinyl group) content is too high, a hard and brittle rubber may result. The alkenyl group content can be determined through calculation based on measurement of $^1$H-NMR spectrum, for example.

Besides, the iodine value of component (A) is in the range of 0.5 to 50 (g/100 g), preferably 0.8 to 40 (g/100 g), more preferably 1 to 30 (g/100 g), and particularly preferably 1.5 to 25 (g/100 g).

If the iodine value is less than 0.5 (g/100 g), the degree of crosslinking would be low, leading to unsatisfactory rubber properties. If the iodine value exceeds 50 (g/100 g), on the other hand, fluidity would be worsened, resulting in a problem concerning processability. The iodine value can be measured according to JIS K0070.

As for the viscosity of component (A), its viscosity at 25° C. under a shear rate of 10 s$^{-1}$ is not less than 10 Pa·s and less than 1,000 Pa·s, preferably in the range of 20 to 800 Pa·s, more preferably 50 to 500 Pa·s, and most preferably 70 to 150 Pa·s. If the viscosity is less than 10 Pa·s, the polymer chains would be too short to obtain satisfactory rubber properties. If the viscosity is not less than 1,000 Pa·s, on the other hand, forming (molding) of the rubber composition may be difficult to achieve, or the rubber processing apparatus needed would be too large to secure economy. Incidentally, the apparatus for measurement of the viscosity may be any one of such a type that viscosity under a shear rate of 10 can be measured. The viscosity of non-Newtonian fluids such as the present rubber composition can be measured by a rheometer type viscometer which is generally called a rotational viscometer and in which the rotating speed can be varied as required.

[Component (B)]

The SiH group-containing compound of component (B) is a compound which reacts with the ethylene-α-olefin-nonconjugated polyene random copolymer rubber of component (A) and which acts as a crosslinking agent. It is essential for the SiH group-containing compound to have a divalent siloxane unit represented by the following formula (namely, monoorganomonohydrogensiloxane units) in side chains of the organopolysiloxane molecule and to have three Si-bonded hydrogen atoms (SiH groups) per one molecule (namely, to have only three monoorganomonohydrogensiloxane units as SiH group-containing siloxane units in one molecule):

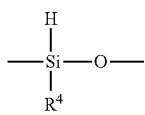

where $R^4$ is an unsubstituted or substituted monovalent hydrocarbon group having 1 to 20 carbon atoms. Preferably, $R^4$ is an unsubstituted or substituted monovalent hydrocarbon group having 1 to 10 carbon atoms.

Examples of such a compound include:

straight chain organopolysiloxanes represented by

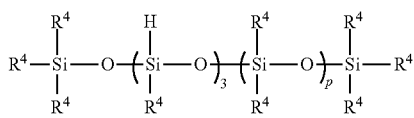

(where groups $R^4$ are, identical or different, unsubstituted or substituted monovalent hydrocarbon groups having 1 to 20, particularly 1 to 10 carbon atoms, and p is an integer of 1 to 20); and cyclic organopolysiloxane represented by

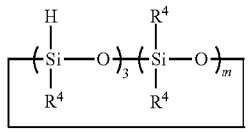

(where groups $R^4$ are identical or different, an unsubstituted or substituted monovalent hydrocarbon groups having 1 to 20, particularly 1 to 10 carbon atoms, and m is an integer of 1 to 20, particularly an integer of 1 to 10).

Examples of the monovalent hydrocarbon group as $R^4$ above include $C_{1-20}$ ones, preferably $C_{1-10}$ ones. Specific examples of the monovalent hydrocarbon group as $R^4$ include: alkyl groups such as methyl, ethyl, propyl, isopropyl, butyl, isobutyl, tert-butyl, pentyl, cyclopentyl, hexyl, cyclohexyl, octyl, decyl, etc.; alkenyl groups such as vinyl, allyl, propenyl, butenyl, hexenyl, cyclohexenyl, etc.; aryl groups such as phenyl, tolyl, etc.; aralkyl groups such as benzyl, phenylethyl, phenylpropyl, etc.; and groups derived from these groups by replacing at least one hydrogen atom thereof by a halogen atom, a cyano group, or a trialkoxysilyl group (in which the alkoxy group has preferably 1 to 6 carbon atoms).

Specific examples of the organopolysiloxane include the following:

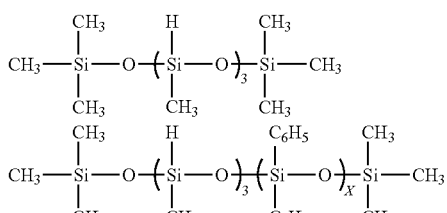

X = an integer of 1 to 10

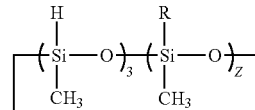

Y = an integer of 1 to 10

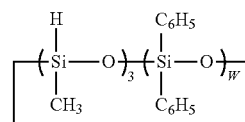

Z = integer of 1 to 3

R=$CH_3$—, $C_2H_5$—, $C_3H_7$—, $C_4H_9$—, $C_5H_{11}$—, $C_6H_{13}$—, $C_6H_5$—, $C_6H_5CH_2CH_2$—, $C_6H_5CH(CH_3)CH_2$—, $(CH_3O)_3SiCH_2CH_2$—, $(CH_3O)_3SiCH_2CH_2CH_2$—, $(C_2H_5O)_3SiCH_2CH_2$—, $(C_2H_5O)_3SiCH_2CH_2CH_2$—

W = an interger of 1 to 3

Among these organopolysiloxanes of component (B), preferred are cyclic siloxanes.

The amount of component (B) blended in the rubber composition is in the range of 0.1 to 50 parts by weight, preferably 0.5 to 30 parts by weight, more preferably 1.0 to 20 parts by weight, per 100 parts by weight of component (A). If the amount of component (B) blended is too small, a rubber with insufficient crosslinking would result. If the amount of component (B) is too large, on the other hand, a hard and brittle rubber may result.

Incidentally, as other organohydrogenpolysiloxane than the SiH group-containing compound of component (B), an organohydrogenpolysiloxane which has at least one monofunctional siloxane unit (namely, a diorgano(mono)hydrogensiloxy group) in its molecule and which has three SiH groups in its molecule and/or a compound (organohydrogenpolysiloxane) having two or at least four SiH groups in its molecule may be blended in the rubber composition. It is to be noted, however, that in this case the proportion of the amount of the SiH group-containing compound other than component (B) in relation to the amount of the compound having three SiH groups of component (B) is preferably so set that the molar ratio of the Si-bonded hydrogen atoms (SiH groups) in the SiH group-containing compound other than component (B) to the SiH groups in both component (B) and the SiH group-containing compound other than component (B) will be not more than 0.5.

[Component (C)]

The reinforcing filler powder of component (C) is a material which is added for the purpose of enhancing rubber properties of the cured product, and may be any one such as carbon black, fumed silica, precipitated silica, diatomaceous earth, fumed titanium oxide, etc. Besides, the reinforcing filler used here may be one whose surfaces have been treated to be hydrophobic. In this case, preferred examples of the surface treating agent for imparting hydrophobic nature include: reactive silanes such as alkylchlorosilane, alkylsilazane, alkoxysilane, etc.; siloxane oligomers having a silanol group or an alkoxysilyl group; low-molecular-weight dialkylcyclosiloxanes, etc; titanates; and various fatty acids. The surface treatment may be carried out by a method in which the powder of component (C) is independently treated in advance, or a method in which the surface treatment is effected by mixing component (C) with the treating agent with or without heating at the time of blending thereof with component (A), or a combination of the two methods.

The blending of the reinforcing filler is conducted in an arbitrary manner. Normally, however, the amount of the reinforcing filler blended, based on 100 parts by weight of component (A), is not more than 100 parts by weight (0 to 100 parts by weight), preferably 5 to 80 parts by weight, more preferably 10 to 60 parts by weight. If the amount of the reinforcing filler exceeds 100 parts by weight, blending may be difficult to achieve or forming (molding) of the resultant rubber composition may be difficult to carry out.

[Component (D)]

The curing reaction catalyst of component (D) is a catalyst for an addition reaction between the alkenyl group of component (A) and the Si-bonded hydrogen atom in the organohydrogenpolysiloxane of component (B). The curing reaction catalyst is preferably a platinum group metal catalyst, and, as the catalyst, there can be used those ones conventionally known as catalysts for addition reaction curing type silicone rubber compositions. Examples of the catalyst which can be used include platinum catalysts such as particulate platinum metal, platinic chloride, chloroplatinic acid, an alcohol solution of chloroplatinic acid hexahydrate, a chloroplatinic acid-olefin complex, platinum bisacetoacetate, etc., palladium catalysts, rhodium catalysts, and so on, adsorbed on a support such as silica, alumina or silica gel. Among these, preferred are platinum and platinum compounds. The amount of the catalyst added may be arbitrarily selected within such a range that the addition reaction can be accelerated. Normally, the catalyst is used in an amount, in terms of the amount of metal, in the range of from 1 ppm to 1 weight % based on the total weight of component (A) and component (B). A suitable amount of the catalyst here is in the range of 5 to 100 ppm. If the amount is less than 1 ppm, the addition reaction would not be accelerated sufficiently, and curing would be insufficient. Use of the catalyst in an amount in excess of 1 weight % yields little additional effect on reactivity, and is uneconomical.

[Component (E)]

The curing reaction retarder of component (E) is a component for controlling the rate of the crosslinking reaction promoted by the curing reaction catalyst of component (D), and is indispensable for carrying out various rubber forming or molding processes such as injection molding, compression molding, etc.

Examples of such a curing reaction retarder include benzotriazole, ethynyl group-containing alcohols (compounds having at least one OH group and at least one alkynyl group in one molecule thereof), acrylonitrile, amide compounds (for example, N,N-diallylacetamide, N,N-diallylbenzamide, N,N,N',N'-tetraallyl-o-phthalic acid diamide, N,N,N',N'-tetraallyl-m-phthalic acid diamide, N,N,N',N'-tetraallyl-p-phthalic acid diamide), sulfur compounds, amine compounds, tin compounds, tetramethyltetravinylcyclotetrasiloxane, organic peroxides such as hydroperoxide, etc. Among these curing reaction retarders, particularly preferable are the ethynyl group-containing alcohols such as ethynylcyclohexanol.

The amount of the curing reaction retarder blended, based on 100 parts by weight of component (A), is in the range of 0.001 to 5 parts by weight, preferably 0.01 to 3 parts by weight, and more preferably 0.05 to 1 part by weight. If the amount is less than 0.001 part by weight, the reaction-controlling effect produced thereby would be insufficient. Use of the curing reaction retarder in an amount in excess of 5 parts by weight, on the other hand, not only makes the reaction proceed too slow but also is uneconomical.

[Other Components]

Incidentally, in addition to the above-described components, such additives as inorganic filler, softener, antioxidant, processing aid, vulcanization accelerator, foaming agent, colorant, dispersing agent, heat resistance improver, flame-retardant, etc. may be blended into the rubber composition, according to the intended use of the crosslinked product of the composition and within such ranges as not to be detrimental to the purpose of the present invention.

As the softener, those commonly used for rubbers can be used. Specific examples of the softener which can be used include petroleum softeners such as process oil, lubricating oil, paraffin, liquid paraffin, petroleum asphalt, Vaseline, etc., coal tar softeners such as coal tar, coal tar pitch, etc., fatty oil softeners such as castor oil, linseed oil, rape oil, coconut oil, etc., waxes such as tall oil, beeswax, carnauba wax, lanolin, etc., fatty acids and fatty acid salts such as ricinoleic acid, palmitic acid, barium stearate, calcium stearate, zinc laurate, etc., and petroleum resins. Among these, preferable are the petroleum softeners, and particularly preferable is process oil. The amount of the softener to be blended is appropriately selected according to the intended use of the crosslinked product.

Examples of the antioxidant include those based on amine, hindered phenol, or sulfur. Particularly, hindered phenol antioxidants are preferable, since they do not hinder the curing reaction. Specific examples of such an antioxidant include 1,1,3-tris-(2-methyl-4-hydroxy-5-t-butylphenyl)butane, 4,4'-butylidenebis-(3-methyl-6-t-butylphenol), 7-octadecyl-3-(4'-hydroxy-3',5'-di-t-butylphenyl) propionate, tetrakis-[methylene-3-(3',5'-di-t-butyl-4'-hydroxyphenyl)-propionato]methane, pentaerythritol tetrakis[3-(3,5-di-t-butyl-4-hydroxyphenyl)-propionate], triethylene glycol-bis[3-(3-t-butyl-5-methyl-4-hydroxy-phenyl)propionate], 1,6-hexanediol-bis[3-(3-t-butyl-5-methyl-4-hydroxyphenyl)-propionate], tris-(3,5-di-t-butyl-4-hydroxybenzyl)-isocyanurate, octadecyl-3-(3,5-di-t-butyl-4-hydroxyphenyl) propionic acid ester, 3,9-bis[2-{3-(3-t-butyl-4-hydroxy-5-methylphenyl)propionyl-oxy}-1,1-dimethylethyl]-2,4,8,10-tetraoxaspiro[5,5]undecane, etc.

The silicone rubber composition according to the present invention can be prepared by mixing the above-described components. The viscosity of the silicone rubber composition, measured at room temperature (25° C.) under a shear rate of 10 s$^{-1}$, is preferably in the range of 50 to 1,500 Pa·s, more preferably 100 to 1,200 Pa·s, and further preferably 200 to 1,000 Pa·s. If the viscosity is below 50 Pa·s, trapping of air into the composition is liable to occur at the time of molding, with the result of formation of voids in the molded product, or too high a fluidity of the composition may lead to easy formation of burrs. If the viscosity exceeds 1,500 Pa·s, the high viscosity may make it difficult to cause the composition to flow into a mold.

The curing rate of the rubber composition is not particularly limited, and the rubber composition may range from those curing at room temperature to those curing at high temperatures. Let the 10% cure time at 130° C., measured by an MDR (or rotorless) type rheometer, be T10 (second), then it is preferable that T10 is in the range of 5 to 120 seconds, more preferably 10 to 80 seconds. If T10 is less than five seconds, such a problem as scorch may occur or the pot life at room temperature may be extremely short. If T10 exceeds 120 seconds, curing is too slow, which is uneconomical.

As a forming and curing method for the silicone rubber composition, there can be used ordinary methods such as injection molding, transfer molding, compression molding, casting, coating, etc. As the forming method, liquid injection molding is preferably adopted. As the curing condition, a heating treatment condition of heating at 100 to 230° C. for three seconds to 30 minutes, preferably at 120 to 180° C. for about five seconds to 15 minutes, may be adopted. After primary forming (molding), postcure (secondary curing) may further be carried out at 80 to 180° C. for 10 minutes to 24 hours, for the purpose of bringing the reaction to completion, removal of volatile components, or the like.

EXAMPLES

Now, the present invention will be described specifically below by showing Examples and Comparative Examples, but the invention is not to be limited to the Examples.

Incidentally, evaluation methods for various properties in Examples and Comparative Examples below are as follows.

(1) Viscosity

Viscosity was measured at 25° C. under shear rate of 0.01 to 20 s$^{-1}$ by use of a precision rotational viscometer, Roto-Visco RV1, made by Haake (the viscosity under a shear rate of 10 s$^{-1}$ was described).

(2) Composition of Ethylene-α-Olefin-Nonconjugated Polyene Random Copolymer Rubber Measurement of $^1$H spectrum at a measurement temperature of 120° C., with a solvent of ODCB-d4 for measurement, and with a number of times of integration of 512 times, was made by use of a nuclear magnetic resonance (NMR) apparatus, ECX400P, made by JEOL Ltd. The compositional ratios of ethylene and α-olefin were calculated from the measurement results.

(3) Amount of Alkenyl Group (mol/g)

The amount of alkenyl group was determined by calculating the double bond content (mol %) of the nonconjugated polyene from the compositional ratios of ethylene, the α-olefin and the nonconjugated polyene which were obtained from the $^1$H spectrum measurement.

(4) Hardness (Type A)

Hardness HA was measured according to JIS K6253.

(5) Tensile Strength (MPa), Elongation (%)

A tensile test was carried out at a measurement temperature of 23° C. and a rate of pulling of 500 mm/min according to JIS K6251, to measure tensile strength TB and elongation EB at rupture of a crosslinked sheet.

Example 1

100 parts by weight of an ethylene-propylene-5-vinyl-2-norbornene copolymer, PX-069, made by Mitsui Chemical, Inc., having an ethylene content of 50 weight %, an alkenyl amount of 0.0005 mol/g, and a viscosity of 135 Pa·s (10 s$^{-1}$/25° C.) as the ethylene-α-olefin-nonconjugated polyene random copolymer rubber (A) and 15 parts by weight of fumed silica, DM20S, made by Tokuyama Corporation, having a specific surface area of 180 m$^2$/g and having surfaces treated with chlorosilane to be hydrophobic, were blended with each other in a planetary mixer for 15 minutes. The thus blended mixture was then admixed with 5.95 parts by weight of organohydrogenpolysiloxane A represented by the following formula:

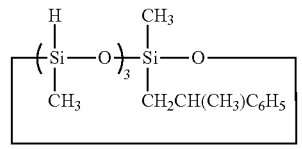

0.15 part by weight of a 1 weight %-toluene solution of chloroplatinic acid (Pt content: 0.5 weight %), and 0.05 part by weight of ethynylhexanol, and blending was further continued for five minutes.

The viscosity at 25° C. of the resulting curable composition was measured, to be 384 Pa·s under a shear rate of 10 s$^{-1}$. The value of T10 (the time required for reaching a 10%-torque value, with the MAX torque at three minutes measurement being taken as 100%) at 130° C. was 24 seconds. The time taken for the curable composition to be cured at 25° C. is 18 days; thus, the curable composition was found to have a sufficient pot life and be excellent in workability and shelf stability.

The curable composition was put to press cure at 150° C., and further to postcure in an oven at 150° C. for an hour, to obtain a 2 mm-thick rubber sheet. Rubber properties of the rubber sheet are shown in Table 1 below.

Example 2

40 parts by weight of an ethylene-propylene-5-vinyl-2-norbornene copolymer, PX-068, made by Mitsui Chemical, Inc., having an ethylene content of 50 weight %, an alkenyl amount of 0.00092 mol/g, and a viscosity of 11 Pa·s (10 s$^{-1}$/25° C.) and 60 parts by weight of an ethylene-propylene-5-vinyl-2-norbornene copolymer, PX-062, made by Mitsui Chemical, Inc., having an ethylene content of 50 weight %, an alkenyl amount of 0.00039 mol/g, and a viscosity of 870 Pa·s (10 s$^{-1}$/25° C.), as the ethylene-α-olefin-nonconjugated polyene random copolymer rubber (A), 25 parts by weight of fumed silica, having a specific surface area of 120 m$^2$/g and having surfaces treated with chlorosilane to be hydrophobic, 4 parts by weight of hexamethyldisilazane, and 2 parts by weight of water were put in a kneader mixer, and were blended at room temperature for 30 minutes and at 120° C. for two hours. An admixture of 125 parts by weight of the thus obtained base material with 6.50 parts by weight of organohydrogenpolysiloxane B represented by the following formula:

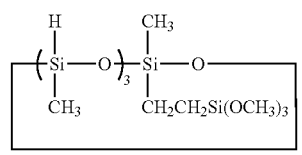

1.3 parts by weight of organohydrogenpolysiloxane C represented by the following formula:

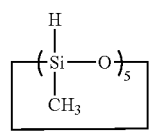

0.2 part by weight of a 1 weight % toluene solution of chloroplatinic acid (Pt content: 0.5 weight %), and 0.05 part by weight of ethynylhexanol, was blended in a planetary mixer for 10 minutes, to obtain a curable composition.

The curable composition had a viscosity of 612 Pa·s (10 s$^{-1}$/25° C.) and a T10 at 130° C. of 18 seconds. The time required for the curable composition to be cured at 25° C. is six days; thus, the curable composition was found to have a sufficient pot life.

The curable composition was cured in the same manner as in Example 1, to obtain a rubber sheet, of which the rubber properties are shown in Table 1.

Example 3

100 parts by weight of the same ethylene-propylene-5-vinyl-2-norbornene copolymer as used in Example 1, PX-069, made by Mitsui Chemical, Inc., having an ethylene content of 50 weight %, an alkenyl amount of 0.0005 mol/g, and a viscosity of 135 Pa·s (10 s$^{-1}$/25° C.), 15 parts by weight of precipitated silica, Nipsil VN3, made by Nihon Silica Kogyo KK, 25 parts by weight of diatomaceous earth, Opuraito W-3005S, made by Hokushu Keisodo KK, having an average particle diameter of 6 μm, 4 parts by weight of hexamethyldisilazane, and 2 parts by weight of water, were put in a kneader-mixer, and blended at room temperature for 30 minutes and at 120° C. for two hours. An admixture of 140 parts by weight of the thus obtained base material with 4.52 parts by weight of organohydrogenpolysiloxane D represented by the following formula:

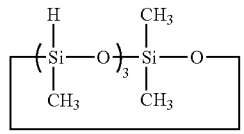

2.19 parts by weight of organohydrogenpolysiloxane E represented by the following formula:

0.2 part by weight of a 1 weight %-toluene solution of chloroplatinic acid (Pt content: 0.5 weight %), and 0.10 part by weight of ethynylhexanol, was blended in a planetary mixer for 10 minutes, to obtain a curable composition.

The curable composition had a viscosity of 389 Pa·s (10 s$^{-1}$/25° C.) and a T10 at 130° C. of 29 seconds. The time required for the curable composition to be cured at 25° C. was 26 days.

The composition was cured in the same manner as in Example 1, to obtain a rubber sheet, of which the rubber properties are shown in Table 1.

Comparative Example 1

A curable composition was obtained in the same manner as in Example 1, except that 5.95 parts by weight of organohydrogenpolysiloxane A was replaced by 5.49 parts by weight of organohydrogenpolysiloxane F represented by the following formula:

The curable composition thus obtained had a viscosity of 397 Pa·s (10 s$^{-1}$/25° C.) and a T10 at 130° C. of 14 seconds. Incidentally, when the curable composition was left to stand at 25° C. in order to check the pot life at room temperature, the composition was cured after three hours. Thus, the curable composition was found to have a short pot life and be poor in workability and shelf stability.

The composition was cured in the same manner as in Example 1, to obtain a rubber sheet, of which the rubber properties are shown in Table 1.

Comparative Example 2

A curable composition was obtained in the same manner as in Example 2, except that 6.50 parts by weight of organohydrogenpolysiloxane B was replaced by 3.04 parts by weight of organohydrogenpolysiloxane G represented by the is following formula:

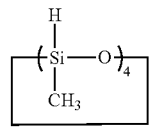

The curable composition thus obtained had a viscosity of 624 Pas (10 s$^{-1}$/25° C.) and a T10 at 130° C. of 19 seconds. The time required for the composition to be cured at 25° C. was six days.

The composition was cured in the same manner as in Example 1, to obtain a rubber sheet, of which the rubber properties are shown in Table 1. The cured rubber product was found to be poorer than that obtained in Example 2 in rubber properties such as tensile strength and elongation.

Comparative Example 3

A curable composition was obtained in the same manner as in Example 3, except that 4.52 parts by weight of organohydrogenpolysiloxane D was replaced by 7.22 parts by weight of organohydrogenpolysiloxane H represented by the following formula:

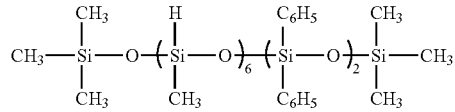

The curable composition thus obtained had a viscosity of 402 Pa·s (10 s$^{-1}$/25° C.) and a T10 at 130° C. of 33 seconds. The time required for the composition to be cured at 25° C. was 29 days.

The composition was cured in the same manner as in Example 1, to obtain a rubber sheet, of which the rubber properties are shown in Table 1. The cured rubber product was found to be poorer than that obtained in Example 3 in rubber properties such as tensile strength and elongation.

TABLE 1

|  | Example | | | Comparative Example | | |
|---|---|---|---|---|---|---|
|  | 1 | 2 | 3 | 1 | 2 | 3 |
| Hardness (type A) | 42 | 50 | 36 | 43 | 55 | 45 |
| Tensile strength (MPa) | 2.9 | 4.6 | 3.0 | 2.8 | 2.9 | 2.1 |
| Elongation (%) | 180 | 220 | 230 | 170 | 150 | 130 |

Japanese Patent Application No. 2010-126799 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A crosslinkable rubber composition comprising as essential components:

(A) 100 parts by weight of an ethylene-α-olefin-nonconjugated polyene random copolymer rubber in which the nonconjugated polyene has at least one terminal vinyl group-containing norbornene compound represented by the following general formula (I) or (II),

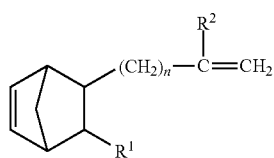

wherein n is an integer of 0 to 10, $R^1$ is hydrogen atom or an alkyl group of 1 to 10 carbon atoms, and $R^2$ is hydrogen atom or an alkyl group of 1 to 5 carbon atoms,

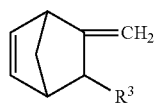

wherein $R^3$ is hydrogen atom or an alkyl group of 1 to 10 carbon atoms, and which has a viscosity of not less than 10 Pa·s and less than 1,000 Pa·s at 25° C. under a shear rate of 10 $s^{-1}$;

(B) 0.1 to 50 parts by weight of an organopolysiloxane which has three Si-bonded hydrogen atoms per molecule in side chains of siloxane represented by the following formula:

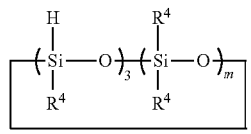

wherein the groups $R^4$ are independently unsubstituted or substituted monovalent hydrocarbon groups having 1 to 20 carbon atoms and m is an integer of 1 to 20;

(C) 0 to 100 parts by weight of a reinforcing filler;
(D) a catalytic amount of a curing catalyst; and
(E) 0.001 to 5 parts by weight of a curing reaction retarder.

2. The crosslinkable rubber composition according to claim 1, wherein curing reaction retarder component (E) is a compound which has an OH group and an alkynyl group in one molecule thereof.

3. The crosslinkable rubber composition according to claim 1,
wherein ethylene-α-olefin-nonconjugated polyene random copolymer rubber component (A) contains (a) the ethylene unit and (b) the α-olefin unit in a molar ratio (a)/(b) in the range of 40/60 to 95/5, and wherein the nonconjugated polyene is blended in such a proportion that the content of the alkenyl group derived from the nonconjugated polyene in the ethylene-α-olefin-nonconjugated polyene random copolymer rubber upon copolymerization is 0.0001 to 0.002 mol/gram.

4. The crosslinkable rubber composition according to claim 1, wherein reinforcing filler component (C) is present in an amount of 5 to 80 parts by weight per 100 parts by weight of component (A).

5. The crosslinkable rubber composition according to claim 1, wherein the at least one terminal vinyl group-containing norbornene compound in component (A) is a member selected from the group consisting of 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene, and 5-methylene-2-norbornene.

6. The crosslinkable rubber composition according to claim 1, wherein filler component (C) is a powder comprising carbon black, fumed silica, precipitated silica, diatomaceous earth, or fumed titanium oxide, the surface of which powder has been treated to be hydrophobic.

7. The crosslinkable rubber composition according to claim 1, wherein catalyst component (D) is particulate platinum metal, platinic chloride, chloroplatinic acid, an alcohol solution of chloroplatinic acid hexahydrate, a chloroplatinic acid-olefin complex, or platinum bisacetoacetate, adsorbed on a silica, alumina, or silica gel support.

8. The crosslinkable rubber composition according to claim 1, wherein curing reaction retarder (E) is a benzotriazole, acrylonitrile, hydroperoxide, N,N,N',N'-tetraallyl-o-phthalic acid diamide, N,N,N',N'-tetraallyl-m-phthalic acid diamide, N,N,N',N'-tetraallyl-p-phthalic acid diamide, tetramethyltetravinylcyclotetrasiloxane, N,N-diallylacetamide, N,N-diallylbenzamide, or ethynyl group-containing alcohol.

9. The crosslinkable rubber composition according to claim 8, wherein curing reaction retarder (E) is blended in an amount of 0.001 to 5 parts by weight based upon 100 parts by weight of component (A).

10. A crosslinkable rubber composition comprising as essential components:

(A) 100 parts by weight of an ethylene-α-olefin-nonconjugated polyene random copolymer rubber in which the nonconjugated polyene has at least one terminal vinyl group-containing norbornene compound represented by the following general formula (I) or (II),

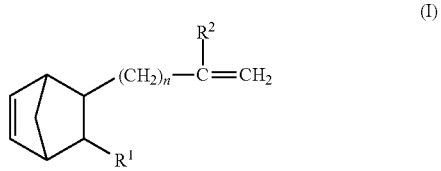

wherein n is an integer of 0 to 10, $R^1$ is hydrogen atom or an alkyl group of 1 to 10 carbon atoms, and $R^2$ is hydrogen atom or an alkyl group of 1 to 5 carbon atoms,

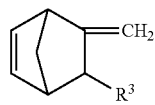
(II)

wherein $R^3$ is hydrogen atom or an alkyl group of 1 to 10 carbon atoms, and which has a viscosity of not less than 10 Pa·s and less than 1,000 Pa·s at 25° C. under a shear rate of 10 $s^{-1}$;

(B) 0.1 to 50 parts by weight of a straight chain organopolysiloxane of the formula

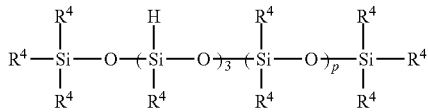

wherein the groups $R^4$ are independently unsubstituted or substituted monovalent hydrocarbon groups having 1 to 20 carbon atoms and p is an integer of 1 to 20;

(C) 0 to 100 parts by weight of a reinforcing filler;

(D) a catalytic amount of a curing catalyst; and (E) 0.001 to 5 parts by weight of a curing reaction retarder.

11. The crosslinkable rubber composition according to claim 10, wherein curing reaction retarder component (E) is a compound which has an OH group and an alkynyl group in one molecule thereof.

12. The crosslinkable rubber composition according to claim 10, wherein ethylene-α-olefin-nonconjugated polyene random copolymer rubber component (A) contains (a) the ethylene unit and (b) the α-olefin unit in a molar ratio (a)/(b) in the range of 40/60 to 95/5, and wherein the nonconjugated polyene is blended in such a proportion that the content of the alkenyl group derived from the nonconjugated polyene in the ethylene-α-olefin-nonconjugated polyene random copolymer rubber upon copolymerization is 0.0001 to 0.002 mol/gram.

13. The crosslinkable rubber composition according to claim 10, wherein reinforcing filler component (C) is present in an amount of 5 to 80 parts by weight per 100 parts by weight of component (A).

14. The crosslinkable rubber composition according to claim 10, wherein the at least one terminal vinyl group-containing norbornene compound in component (A) is a member selected from the group consisting of 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, 5-(7-octenyl)-2-norbornene, and 5-methylene-2-norbornene.

15. The crosslinkable rubber composition according to claim 10, wherein filler component (C) is a powder comprising carbon black, fumed silica, precipitated silica, diatomaceous earth, or fumed titanium oxide, the surface of which powder has been treated to be hydrophobic.

16. The crosslinkable rubber composition according to claim 10, wherein catalyst component (D) is particulate platinum metal, platinic chloride, chloroplatinic acid, an alcohol solution of chloroplatinic acid hexahydrate, a chloroplatinic acid-olefin complex, or platinum bisacetoacetate, adsorbed on a silica, alumina, or silica gel support.

17. The crosslinkable rubber composition according to claim 10, wherein curing reaction retarder (E) is a benzotriazole, acrylonitrile, hydroperoxide, N,N,N',N'-tetraallyl-o-phthalic acid diamide, N,N,N',N'-tetraallyl-m-phthalic acid diamide, N,N,N',N'-tetraallyl-p-phthalic acid diamide, tetramethyltetravinylcyclotetrasiloxane, N,N-diallylacetamide, N,N-diallylbenzamide, or ethynyl group-containing alcohol.

18. The crosslinkable rubber composition according to claim 8, wherein curing reaction retarder (E) is blended in an amount of 0.001 to 5 parts by weight based upon 100 parts by weight of component (A).

\* \* \* \* \*

UNITED STATES PATENT AND TRADEMARK OFFICE
CERTIFICATE OF CORRECTION

PATENT NO. : 8,530,550 B2
APPLICATION NO. : 13/151023
DATED : September 10, 2013
INVENTOR(S) : Akira Sannomiya et al.

It is certified that error appears in the above-identified patent and that said Letters Patent is hereby corrected as shown below:

ON THE TITLE PAGE:

At item (73), Assignees, correct the identity of the second-named Assignee as follows:

Change: "Shin-Ets Chemical Co., Ltd., Tokyo (JP)"

To: --Shin-Etsu Chemical Co., Ltd., Tokyo (JP)--.

Signed and Sealed this
Fourth Day of February, 2014

Michelle K. Lee
*Deputy Director of the United States Patent and Trademark Office*